Patented Feb. 20, 1934

1,947,467

UNITED STATES PATENT OFFICE 1,947,467

RECOVERY OF BLOCK SULPHUR FROM THE PRODUCTS CONTAINING SULPHUR OBTAINED FROM THE WET PURIFICATION OF GAS AND ESPECIALLY OF COAL DISTILLATION GASES

Wilhelm Fitz, Essen, Germany

No Drawing. Application April 1, 1932, Serial No. 602,617, and in Germany April 4, 1931

4 Claims. (Cl. 23—229)

The invention relates to the recovery of sulphur from gases containing hydrogen sulphide and especially from crude coal distillation gas, whereby the gas to be cleaned is washed with a liquid, which absorbs the hydrogen sulphide, in such a way that sulphur compounds are formed from which the sulphur can be precipitated in elementary form.

It is well-known that gases containing hydrogen sulphide can be washed with an aqueous suspension of ferro-manganese or zinc hydroxides or similar compounds by which metal sulphides are formed from which, by treating the spent washing liquid with oxygen or gases containing oxygen (air) elementary sulphur can be recovered in a finely divided form, the metal hydroxides being at the same time regenerated. The sulphur thus obtained has generally the form of a foam swimming, as in the known flotation processes, on the surface of the liquid penetrated by the oxidation gas. It is now practically impossible to smelt this sulphur foam to a regulus by the heating up of same with water under pressure owing to the facts that this sulphur foam contains considerable quantities of sulphides and cyanogen compounds. The impurities spread themselves over the single particles of sulphur forming a kind of skin which prevents their segregation.

It is further well-known that gases containing hydrogen sulphide can be treated by solutions of thionates especially iron, manganese or zincthionates for the purpose of recovering the hydrogen sulphide. As an example of the reaction, which takes place during this process, the following equation is given:

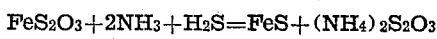

The metal sulphide formed during the washing of the gas is then re-converted into metal thionate by means of sulphur dioxide according to the equation:

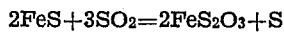

whereby elementary sulphur is formed. The elementary sulphur in the case of the last named reaction, is also precipitated in a finely divided form and the working up of same to block sulphur offers similar difficulties as the treatment of the sulphur produced by the hydroxide gas purification process as it likewise contains a certain proportion of non-decomposed sulphides and cyanogen compounds.

It has been proposed to heat up under pressure the finely divided sulphur resulting from the already mentioned and similar gas purification processes for the purpose of smelting same together to one regulus, in the presence of mineral acids of medium concentration to which, in case the sulphur contains still tarry impurities, oxidizing substances are added for the decomposition of same. It has, however, up to the present, not been possible to make this process pay as there was up to them no cheap material available for the making of the vessels under pressure which were able to withstand at high temperatures the attacks of mineral acids, (for instance sulphuric acid) of medium concentration.

The object of my present invention is to provide a new improved process for the recovery of block sulphur and the like from the finely divided sulphur, resulting from the wet purification of gas, by which from the contaminated sulphur foam a high yield of elementary sulphur can be obtained in the form of a regulus and which may be carried out, without difficulty under pressure in vessels made of ordinary metal, proof against the attacks of acid or rusting.

I have found that the sulphur foam arising from the gas purification process can be transformed in a surprising manner also by the treatment of oxidizing substances alone and in the absence of mineral acids, into sulphur regulus. The new process invented by me consists in that the impure sulphur foam is treated with an oxidizing medium preferably a solution, e. g. an aqueous solution of oxidizing agents under pressure, at temperatures above the melting point of sulphur. In this way, there is obtained from the green-greyish impure sulphur foam, a golden yellow pure molten sulphur, which flows together at the bottom of the pressure vessel forming an easily flowing regulus, which can be easily removed from the pressure vessel. The sulphur obtained according to my process contains only a small percentage of impurities so that it can be used practically without difficulty for all purposes.

A further advantage of the process invented by me lies in the fact that the re-melting of the sulphur can be carried out in a pressure vessel, consisting of the usual cheap material used for the construction of chemical apparatus, for instance Siemens-Marin steel or non-rusting chromium nickel steel.

As oxidizing substance, I can, according to my present invention, employ for instance nitrates, chlorates, perborates and the like.

In carrying out the process, according to my invention, the method is about as follows: It is assumed that sulphur foam has to be treated, which has been recovered, according to the hydroxide gas purification process. The sulphur foam contains about 45% sulphur, 35% moisture, 5% metallic cyanogen compounds, 3% metal sulphides and 12% salts soluble in water. The sulphur foam is put into a pressure boiler, 100 kilos of the foam being mixed with 20 kilos of potassium nitrate in the form of a 50% aqueous solution. The mixture is then heated up to a temperature above 130° centigrade until the sulphur held in the foam is precipitated to the bottom of the boiler in the form of a regulus. The regulus is separated out from the solution of salt and is cast into suitable forms, in which it solidifies forming blocks or the like.

I do not wish that my present invention be confined to the special method of carrying out, which has been described in the foregoing. It may, on the contrary, be varied at will within the scope of the claims hereinafter made.

I claim:

1. A process for the recovery of molten sulphur from contaminated sulphur foam resulting from the recovery of hydrogen sulphide from gases by wet purification, comprising treating the sulphur foam with oxidizing means in the absence of free mineral acids at temperatures above the melting point of sulphur and separating out the sulphur from the salt solution thereby resulting.

2. The process for the recovery of molten sulphur from contaminated sulphur foam resulting from the recovery of hydrogen sulphide from gases by wet purification comprising treating the sulphur foam with salts of nitric acid in the absence of free mineral acids at temperatures above the melting point of sulphur and separating out the sulphur from the resulting salt solution.

3. The process for the recovery of molten sulphur from contaminated sulphur foam resulting from the recovery of hydrogen sulphide from gases by wet purification comprising treating the sulphur foam with potassium nitrate in the absence of free acid at temperatures above the melting point of the sulphur and separating out the sulphur from the resulting salt solution.

4. The process as set forth in claim 1 wherein the oxidizing medium is applied in the form of an aqueous solution.

WILHELM FITZ.